(12) United States Patent
Winter et al.

(10) Patent No.: US 8,494,503 B2
(45) Date of Patent: Jul. 23, 2013

(54) SYSTEM AND METHOD FOR SMART REDIALLING FOR CONFERENCE CALLS

(75) Inventors: Bruce Edward Winter, Waterloo (CA); Andrew Douglas Bocking, Waterloo (CA); Lawrence Edward Kuhl, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 497 days.

(21) Appl. No.: 12/635,956

(22) Filed: Dec. 11, 2009

(65) Prior Publication Data

US 2011/0143736 A1 Jun. 16, 2011

(51) Int. Cl.
*H04M 3/00* (2006.01)

(52) U.S. Cl.
USPC ..... 455/416; 455/417; 455/414.1; 455/412.1; 455/412.2; 379/355.01; 379/201.1; 379/201.02; 379/215.01; 370/260; 370/261; 370/262

(58) Field of Classification Search
USPC .................... 379/93.21, 205.01, 158, 202.01, 379/355.01, 201.01, 201.02, 215.01; 455/416, 455/417, 414.1, 412.1, 412.2, 413; 370/260, 370/261, 262
See application file for complete search history.

(56) References Cited

U.S. PATENT DOCUMENTS

| | | | |
|---|---|---|---|
| 6,505,040 B1 | 1/2003 | Kim | |
| 6,870,927 B1 * | 3/2005 | Theis | 379/355.01 |
| 8,090,087 B2 * | 1/2012 | Jobs et al. | 379/93.21 |
| 2004/0037404 A1 * | 2/2004 | Punjabi | 379/201.01 |
| 2004/0203977 A1 * | 10/2004 | Kennedy | 455/518 |
| 2005/0074107 A1 * | 4/2005 | Renner et al. | 379/202.01 |
| 2008/0049921 A1 * | 2/2008 | Davis et al. | 379/202.01 |
| 2009/0264113 A1 | 10/2009 | Jheng | |
| 2010/0189244 A1 * | 7/2010 | Sastry | 379/202.01 |

FOREIGN PATENT DOCUMENTS

| | | |
|---|---|---|
| DE | 102008030668 A1 | 10/2009 |
| WO | 2004045237 A2 | 5/2004 |

OTHER PUBLICATIONS http://lypp.com/.
http://www.skype.com/help/guides/.
http://investing/businessweek.com/research/stocks/private/snap-shot.asp?privcapId=40090.
European Patent Office, Extended European Search Report dated Jun. 7, 2010, issued in European Patent Application No. 09 178 965.1.
Matias, Erny Reichl Hoffmann, Response to Extended European Search Report dated Aug. 13, 2010, filed in European Patent Application No. 09 178 965.1.
European Patent Office, Communication under Rule 71(3) EPC dated Nov. 23, 2012, issued in European Patent Application No. 09 178 965.1.
Canadian Intellectual Property Office, Examination Report dated Mar. 15, 2013, issued in Canadian Patent Application No. 2,724,090.

* cited by examiner

*Primary Examiner* — Kamran Afshar
*Assistant Examiner* — Khalid Shaheed
(74) *Attorney, Agent, or Firm* — Norton Rose Fulbright Canada LLP

(57) ABSTRACT

A wireless device and method are provided for redialing of conference calls comprising: establishing a call connection based on a first dialed number; monitoring for subsequent numbers dialed after the establishment of the call connection; determining if the subsequent numbers dialed meet predetermined criteria; and saving the first dialed number and the subsequent numbers dialed in a memory of the wireless device as a saved first dialed number and saved subsequent numbers if the predetermined criteria are met.

20 Claims, 5 Drawing Sheets

SYSTEM AND METHOD FOR SMART REDIALLING FOR CONFERENCE CALLS

TECHNICAL FIELD

The present disclosure relates generally to telecommunications with portable devices, and more particularly to a system and method for smart redialing for conference calls.

BACKGROUND

People increasingly have portable electronic devices, such as cellular phones, personal digital assistants, pagers, etc. Many portable electronic devices are able to place telephone calls of one sort or another. People often use these portable electronic devices to call into conference calls while on the go, for example while walking or driving. Users are typically required to manually enter information such as access codes when joining a call on a conference bridge. Conventional solutions either require that the user has pre-programmed the portable electronic device with the information needed to join the conference call or have the conference bridge call the user back.

BRIEF DESCRIPTION OF THE DRAWINGS

Reference will now be made to the drawings, which show by way of example, implementations of the present disclosure, and in which.

It will be noted that throughout the appended drawings, like features are identified by like reference numerals.

DETAILED DESCRIPTION

One aspect of the description provides a wireless device comprising a processor for controlling operation of the wireless device; at least one input device coupled to the processor for accepting an input; at least one display device coupled to the processor for communicating an output; a communications subsystem coupled to the processor for communicating with a communications network; a memory coupled to the processor; and a storage device coupled to the processor. The wireless device includes a calling module resident in the memory for execution by the processor. The calling module is configured to establish a call connection based on a first dialed number; monitor for subsequent numbers dialed on the at least one input device after the establishment of the call connection; determine if the subsequent numbers dialed meet predetermined criteria; and save the first dialed number and the subsequent numbers dialed in the memory as a saved first dialed number and saved subsequent numbers if the predetermined criteria are met.

Another aspect of the description provides a method in a wireless device for redialing of conference calls comprising establishing a call connection based on a first dialed number; monitoring for subsequent numbers dialed after the establishment of the call connection; determining if the subsequent numbers dialed meet predetermined criteria; and saving the first dialed number and the subsequent numbers dialed in a memory of the wireless device as a saved first dialed number and saved subsequent numbers if the predetermined criteria are met.

Figure 1:
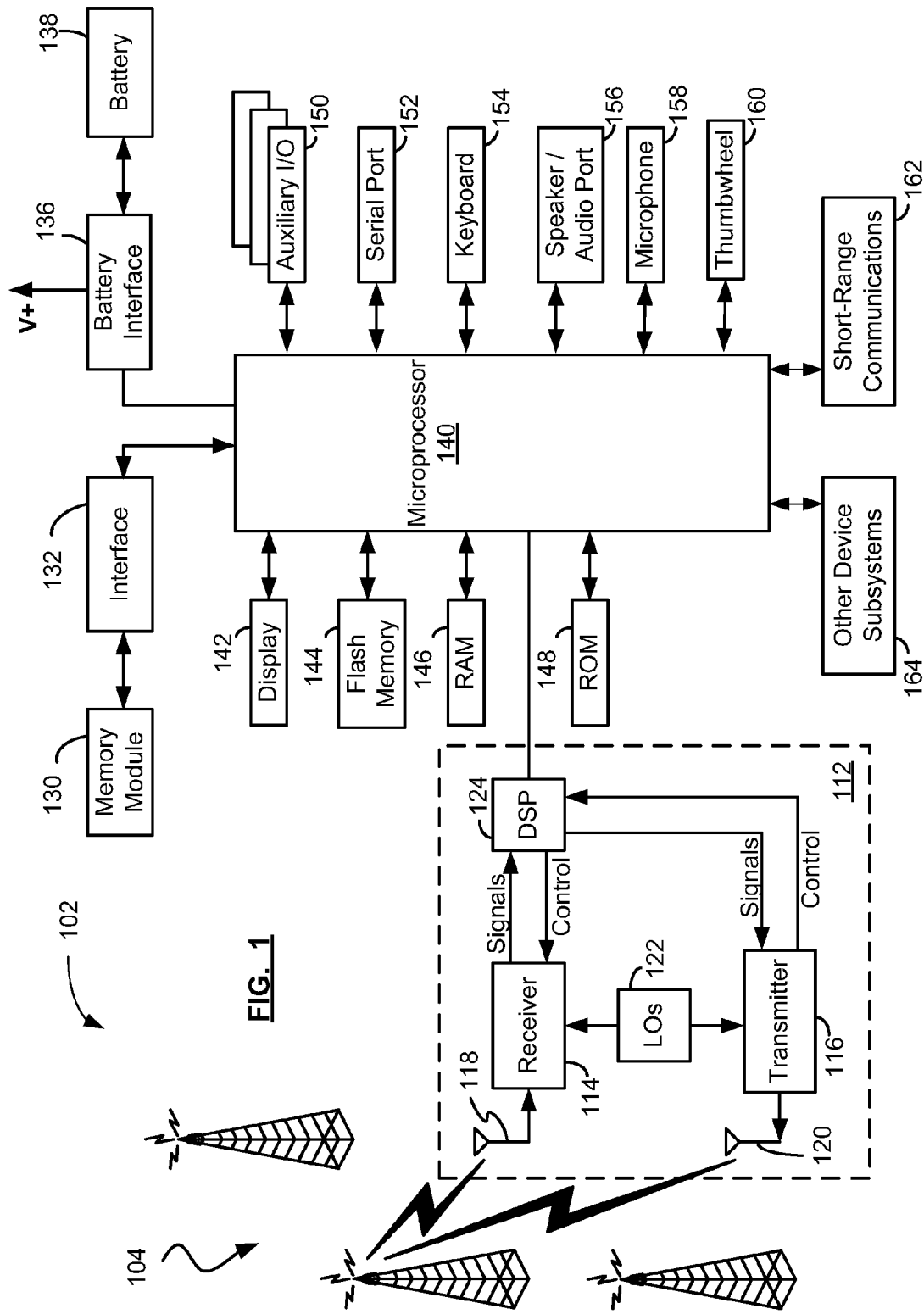
FIG. 1 shows in block diagram form a wireless device suitable for implementing a system and method for smart redialing accordance with one implementation.

Reference is first made to FIG. 1, which shows a block diagram illustrating a portable wireless device 102 that may be used for implementing a system and method for smart redialing for conference calls in accordance with one aspect of the present disclosure. The wireless device 102 communicates through a wireless communication network 104. The wireless network 104 includes antenna, base stations, and supporting radio equipment as for supporting wireless communications between the wireless device 102 and other devices connected to wireless network 104. The wireless network 104 may be coupled to a wireless network gateway and to a wide area network, shown in FIG. 2.

In one implementation, the wireless device 102 is a two-way communication device having at least voice and/or data communication capabilities, including the capability to communicate with other computer systems. In one implementation, the wireless device 102 is a handheld device. Depending on the functionality provided by the wireless device 102, the wireless device 102 may be referred to as a data messaging device, a two-way pager, a cellular telephone with data messaging capabilities, a wireless Internet appliance, a data communication device (with or without telephony capabilities), or a portable media or music player. The wireless device 102 may communicate with any one of a plurality of fixed transceiver stations within its geographic coverage area.

The wireless device 102 may incorporate a communication subsystem 112, which includes a receiver 114, a transmitter 116, and associated components, such as one or more antenna elements 118 and 120, local oscillators (LOs) 122, and a processing module such as a digital signal processor (DSP) 124. In one implementation, the antenna elements 118 and 120 may be embedded or internal to the wireless device 102. As will be apparent to those skilled in the field of communications, the particular design of the communication subsystem 112 depends on the wireless network 104 in which the wireless device 102 is intended to operate.

The wireless device 102 may send and receive communication signals over the wireless network 104 after the required network registration or activation procedures have been completed. Signals received by the antenna 118 through the wireless network 104 are input to the receiver 114, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 124. In a similar manner, signals to be transmitted are processed, including modulation and encoding, for example, by the DSP 124. These DSP-processed signals are input to the transmitter 116 for digital-to-analog (D/A) conversion, frequency up conversion, filtering, amplification, and transmission to the wireless network 104 via the antenna 120. The DSP 124 not only processes communication signals, but also provides for receiver and transmitter control. For example, the gains applied to communication signals in the receiver 114 and the transmitter 116 may be adaptively controlled through automatic gain control algorithms implemented in the DSP 124.

Network access is associated with a subscriber or user of the wireless device 102 via a memory module, such as a memory module 130, which may be a Subscriber Identity Module (SIM) card for use in a GSM network or a USIM card for use in a UMTS. The SIM card is inserted in or connected to an interface 132 of the wireless device 102 in order to operate in conjunction with the wireless network 104. Alternatively, the wireless device 102 may have an integrated identity module for use with systems such as Code Division Multiple Access (CDMA) systems.

The wireless device 102 also includes a battery interface 136 for receiving one or more rechargeable batteries 138. The battery 138 provides electrical power to at least some of the electrical circuitry in the wireless device 102, and the battery interface 136 provides a mechanical and electrical connection for the battery 138. The battery interface 136 is coupled to a regulator (not shown) which provides power V+ to the circuitry of the wireless device 102.

The wireless device 102 includes a microprocessor 140 which controls the overall operation of the wireless device 102. Communication functions, including at least data and voice communications, are performed through the communication subsystem 112. The microprocessor 140 also interacts with additional device subsystems such as a display 142, a flash memory 144, a random access memory (RAM) 146, a read-only memory (ROM) 148, auxiliary input/output (I/O) subsystems 150, a Universal Serial Bus (USB) port 152, a keyboard or keypad 154, a speaker or audio port 156 for connecting to, for example a set of headphones, a microphone 158, a navigation input device 160 such as a clickable thumbwheel, thumbwheel, or set of scroll buttons or trackball, a short-range communications subsystem 162, and any other device subsystems generally designated as 164. Some of the subsystems shown in FIG. 1 perform communication-related functions, whereas other subsystems may provide "resident" or on-device functions. Notably, some subsystems, such as the keypad 154, the display 142, and the navigation input device 160, for example, may be used for both communication-related functions, such as entering a text message for transmission over the wireless network 104, and executing device-resident functions such as a calculator or task list. In one example, the keyboard 154 and the display 142 may be implemented as an integrated touch screen device where a user touches the touch screen 142, 154 to provide input for the microprocessor 140 in response to options shown on the display 142. Operating system software used by the microprocessor 140 is preferably stored in a persistent store such as the flash memory 144, which may alternatively be the ROM 148 or similar storage element. Those skilled in the art will appreciate that the operating system, specific device applications, or parts thereof, may be temporarily loaded into a volatile store such as the RAM 146.

The microprocessor 140, in addition to its operating system functions, enables execution of software applications on the wireless device 102. A predetermined set of applications that control basic device operations, including data and voice communication applications, will normally be installed on the wireless device 102 during or after manufacture. The wireless device 102 may include a personal information manager (PIM) application having the ability to organize and manage data items relating to a user such as, but not limited to, instant messaging, email, calendar events, voice mails, appointments, and task items. One or more memory stores may be available on the wireless device 102 to facilitate storage of information, such as the flash memory 144, the RAM 146, the ROM 148, the memory module 130, or other types of memory storage devices such as external hard drives, flash drives, or FLASH memory cards represented by the other device subsystems 164, such as Secure Digital (SD) cards, mini SD cards, micro SD cards, etc.

The PIM and/or media applications have the ability to send and receive data items via either the wireless network 104 or a link to a computer system. The link to the computer system may be via the serial port 152 or the short-range communications subsystem 162. Additional applications may also be loaded onto the wireless device 102 through the wireless network 104, the auxiliary I/O subsystem 150, the serial port 152, the short-range communications subsystem 162, or any other suitable subsystem 164, and installed by a user in the RAM 146 or a non-volatile store such as the ROM 148 for execution by the microprocessor 140. Such flexibility in application installation increases the functionality of the wireless device 102 and may provide enhanced on-device functions, communication-related functions, or both. For example, secure communication applications may enable electronic commerce functions and other such financial transactions to be performed using the wireless device 102.

In a data communication mode, a received data signal representing information such as a text message, an email message, a media file to be transferred, or Web page download will be processed by the communication subsystem 112 and input to the microprocessor 140. The microprocessor 140 will further process the signal for output to the display 142 or alternatively to the auxiliary I/O device 150. A user of the wireless device 102 may also compose data items, such as email messages, for example, using the keypad 154 and/or the navigation input device 160 in conjunction with the display 142 and possibly the auxiliary I/O device 150. The keypad 154 may be either a complete alphanumeric keypad or telephone-type keypad or a keypad displayed on the display 142 of the touch screen 142, 154.

For voice communications, the overall operation of the wireless device 102 is similar, except that the received signals would be output to the speaker or audio port 156 and signals for transmission would be generated by a transducer such as the microphone 158. Alternative voice or audio I/O subsystems, such as a voice message recording subsystem, may also be implemented on the wireless device 102. Although voice or audio signal output is typically accomplished primarily through the speaker or audio port 156, the display 142 may also be used to provide an indication of the identity of a calling party, duration of a voice call, or other voice call related information. Stereo headphones may also be used in place of the speaker 156.

The serial port 152 is normally implemented in a personal digital assistant (PDA) type communication device for which synchronization with a user's computer is an optional component. The serial port 152 enables a user to set preferences through an external device or software application and extends the capabilities of the wireless device 102 by providing for information, media file, or software downloads to the wireless device 102 other than through the wireless network 104.

The short-range communications subsystem 162 is an additional optional component which provides for communication between the wireless device 102 and different systems or devices, which need not necessarily be similar devices. For example, the subsystem 162 may include an infrared device and associated circuits and components, or a wireless bus protocol compliant communication mechanism such as a Bluetooth™ communication module to provide for communication with similarly-enabled systems and devices (Bluetooth™ is a registered trademark of Bluetooth SIG, Inc.). In another implementation, the short-range communications subsystem 162 may be a wireless networking communications subsystem, conforming to IEEE 802.11 standards such as 802.11b, 802.11g, and/or 802.11n.

Figure 2:
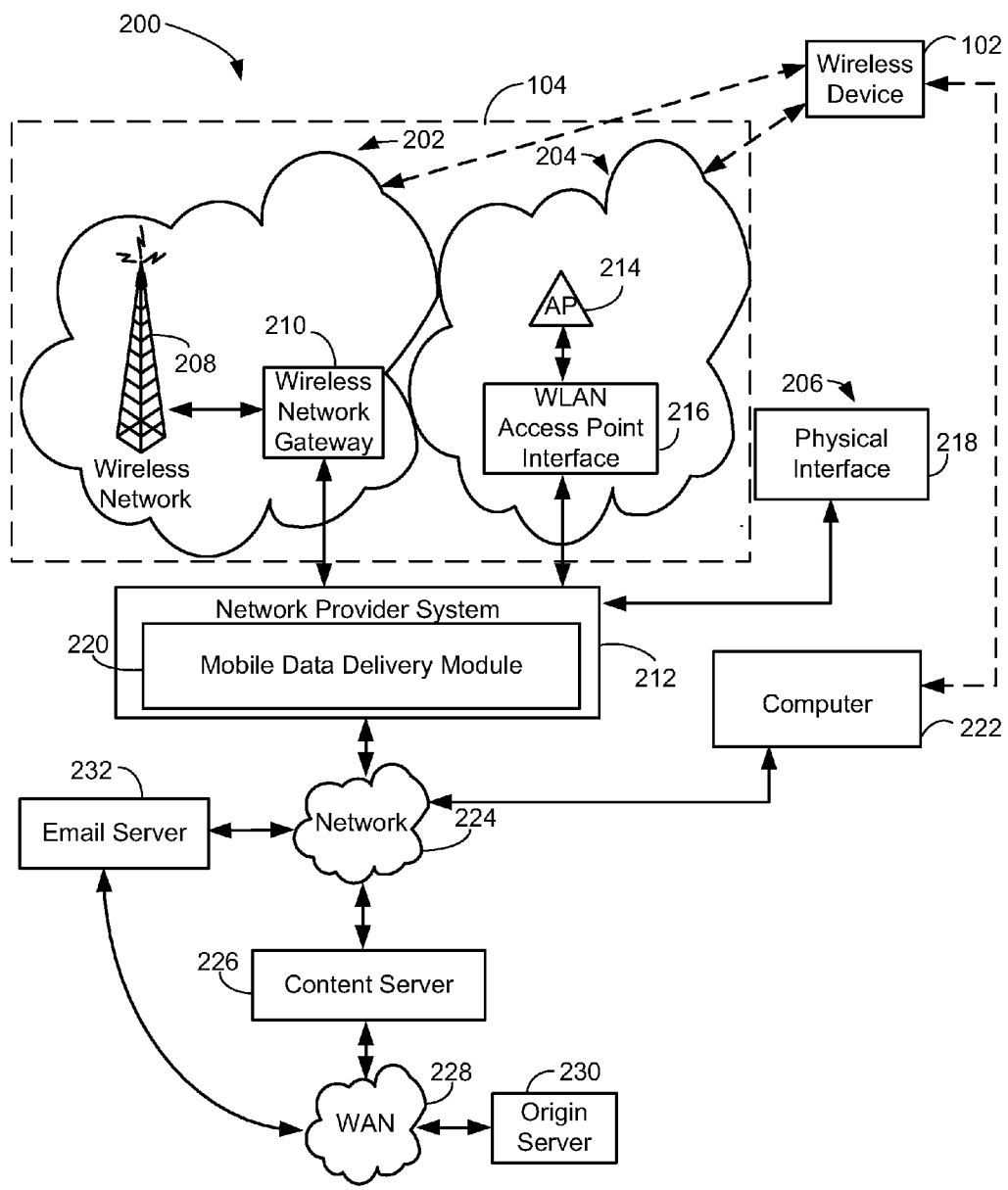
FIG. 2 shows in block diagram form a communication system suitable for providing the operating environment of the wireless device of FIG. 1 in accordance with one implementation.

Reference is next made to FIG. 2, which shows a communication system 200 suitable for use with the wireless device 102 shown in FIG. 1. The communication system 200 generally includes one or more wireless devices 102 (only one of which is shown in FIG. 2) and the wireless network 104. The wireless network 104 may include a wireless Wide Area Network (WAN) 202, a Wireless Local Area Network (WLAN) 204, and/or other interfaces 206 (which may not necessarily be wireless).

Referring to FIG. 2, the wireless WAN 202 may be implemented as a packet-based cellular or mobile network that includes a number of base stations 208 (one of which is shown in FIG. 2) where each of the base stations 208 provides wireless Radio Frequency (RF) coverage to a corresponding area or cell. The wireless WAN 202 is typically operated by a cellular network service provider that sells subscription packages to users of the wireless devices 102. The wireless WAN 202 comprises a number of different types of networks, for example, Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network) or various other third generation networks such as EDGE (Enhanced Data rates for GSM Evolution), UMTS (Universal Mobile Telecommunications Systems), Evolution-Data Optimized (EV-DO), 3G or 4G based networks.

As shown in FIG. 2, the communications system 200 also includes a wireless network gateway 210 and one or more network provider systems 212. The wireless network gateway 210 provides translation and routing services between the network provider system(s) 212 and the WAN 202, which facilitates communication between the wireless devices 102 and other devices (not shown) connected, directly or indirectly, to the network provider system 212.

The WLAN 204 comprises a network which in some examples conforms to IEEE 802.11 standards such as 802.11b, 802.11g, and/or 802.11n; however, other communications protocols may also be used for the WLAN 204. The WLAN 204 includes one or more wireless RF Access Points (AP) 214 (one of which is shown in FIG. 2) that collectively provide a WLAN coverage area. For the implementation depicted in FIG. 2, the WLAN 204 is operated by an enterprise (for example, a business or university in a building or campus type environment) and the access points 214 are connected to an access point (AP) interface 216. The AP interface 216 provides translation and routing services between the access points 214 and the network provider system 212 to facilitate communication between two or more of the wireless devices 102 and other devices (e.g., such as desktop computers) connected, directly or indirectly, to the network provider system 212. The AP interface 216 is implemented using a computer, for example, a server running a suitable computer program or software.

According to one implementation, the other interfaces 206 may be implemented using a physical interface indicated by reference 218. The physical interface 218 includes an Ethernet, Universal Serial Bus (USB), Firewire, or infrared (IR) connection implemented to exchange information between the network provider system 212 and the wireless device 102.

The network provider system 212 comprises a server or server modules or a number of servers or server modules which are typically located behind a firewall (not shown). The network provider system 212 may include a number of modules including a mobile data delivery module 220. Various modules running on the network provider system 212 may be implemented as a number of services running on a single server or as a number of interconnected servers each running a software program to implement the functionality of the respective module. The network provider system 212 provides access for the wireless devices 102, through either the wireless WAN 202, the WLAN 204, or the other connection 206 to the devices connected, for example, through an enterprise network 224 (e.g., an intranet), to the network provider system 212. In one implementation, the data delivery module 220 is implemented on a computer, such as the network provider system 212.

The enterprise network 224 comprises a local area network, an intranet, the Internet, a direct connection, or combinations thereof. The enterprise network 224 may comprise an intranet for a corporation or other type of organization. In at least some implementations, the network provider system 212 is part of the enterprise network 224, and is located behind a corporate firewall and connected to the wireless network gateway 210 through the Internet. A computer 222 (e.g., a desktop or laptop computer) belonging to the user of the wireless device 102 is typically connected to the enterprise network 224. As described earlier, the wireless device 102 may be temporarily and directly connected to the computer 222 using, for example, the serial port 152. This direct connection may make use of a cradle or docking station connected to a serial port of the computer 222, where the mobile device 102 is placed in the cradle, therefore completing the serial connection between the mobile device 102 and the computer 222. Alternatively, the wireless device 102 may communicate with the computer 222 using the communication subsystem 112 and the WAN 202 and/or the short-range communications subsystem 162 and the WLAN 204.

As shown in FIG. 2, an application/content server 226 may be connected to the enterprise network 224 and also to another network, for example a Wide Area Network (WAN) 228. In some implementations, an email server 232 and/or the content server 226 form part of the enterprise network 224. The WAN 228 may further connect to other networks. The WAN 228 may comprise or be configured with the Internet, a direct connection, a LAN, a wireless communication link, or any combination thereof. Content providers, such as Web servers, may be connected to the WAN 228, an example of which is shown in FIG. 2 as an origin server 230.

According to one implementation, the mobile data delivery module 220 provides connectivity between the wireless WAN 202 and the WLAN 204 and the other connection 206 and devices and/or networks connected directly or indirectly to the network provider system 212. In one implementation, the connectivity provided may be Hypertext Transfer Protocol (HTTP) based connectivity providing an Internet based service connection to devices connected to the wireless WAN 202, the WLAN 204, or the other connection 206 and devices and/or networks connected directly or indirectly to the network provider system 212. The network 224, the application/content server 226, the WAN 228, and the origin server 230, are individually and/or collectively in various combinations a content source for the network provider system 212. It will be appreciated that the system shown in FIG. 2 comprises but one possible communication network or configuration of a multitude of possible configurations for use with the wireless devices 102.

Figure 3:
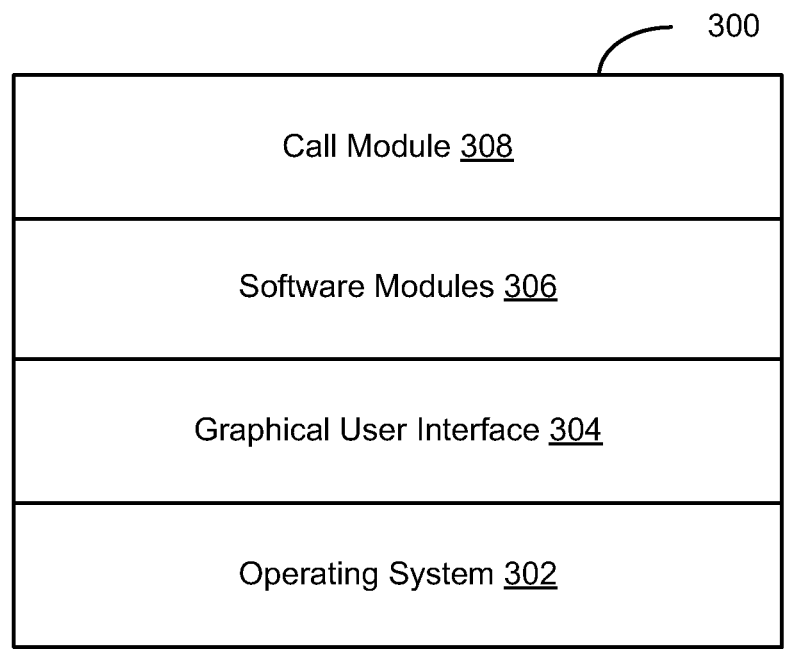
FIG. 3 shows in block diagram form the contents of a memory of the wireless device of FIG. 1.

Reference is next made to FIG. 3, which shows a block diagram illustrating a memory 300 of the wireless device 102. The memory 300 has various software components for controlling the wireless device 102 and may include, for example, the flash memory 144, the RAM 146, the ROM 148, the memory module 130 and/or the other device subsystems 164. In accordance with one implementation, the wireless device 102 is intended to be a multi-tasking wireless communications device configured for sending and receiving data items and for making and receiving voice calls that also includes various applications enabling users to listen to music, watch video files, play games, view picture files, surf the internet wirelessly, etc. To provide a user-friendly environment to control the operation of the wireless device 102, an operating system (OS) 302 resident on the wireless device 102 provides a basic set of operations for supporting various applications typically operable through a graphical user interface (GUI) 304. For example, the operating system 302 provides basic input/output system features to obtain input from the auxiliary I/O 150, the keypad 154 or touch screen 142, 154, the clickable thumbwheel 160, and other input devices, and to facilitate output to the user via the display 142. The GUI 304 is typically a component of the operating system 302. One or more software modules 306 for managing communications or providing a personal digital assistant (PDA) or other functions may also be included. The memory 300 also includes an email and calendar client, which may be combined in, for example, a PIM application having email-based calendaring and scheduling functions. Typically, the PIM is installed as one of the software modules 306.

The memory 300 also includes a call module 308. The call module 308 interacts with aspects of the GUI 304 and OS 302 to provide calling functions for the wireless device 102. In one example, the call module 308 may be integrated into the OS 302 or the GUI 304 and may not be a discrete module 308 as shown in FIG. 3, depending on the design criteria of a particular application. The call module 308 may save and/or retrieve data in the memory 300. The memory 300 may be used by the call module 308 for saving information, either temporarily or permanently. Aspects of the operation of the call module 308 and interaction with this module are described in more detail below in connection with FIG. 5.

Thus, the wireless device 102 includes computer executable programmed instructions for directing the wireless device 102 to implement various applications. The programmed instructions may be embodied in the one or more software modules 306 resident in the memory 300 of the wireless device 102. Alternatively, the programmed instructions may be tangibly embodied on a computer readable medium (such as a DVD, CD, floppy disk or other storage media) which may be used for transporting the programmed instructions to the memory 300 of the wireless device 102 (e.g., A computer program product comprising a computer readable medium having computer readable code stored thereon, for execution by a processor).

Alternatively, the programmed instructions may be embedded in a computer-readable, signal-bearing medium (as opposed to the computer readable medium, discussed above) that is uploaded to the wireless network 104 by a vendor or supplier of the programmed instructions, and this signal-bearing medium may be downloaded through one or more of the interfaces 112, 150, 152, 162 to the wireless device 102 from, for example, the wireless network 104 by end users.

Figure 4:
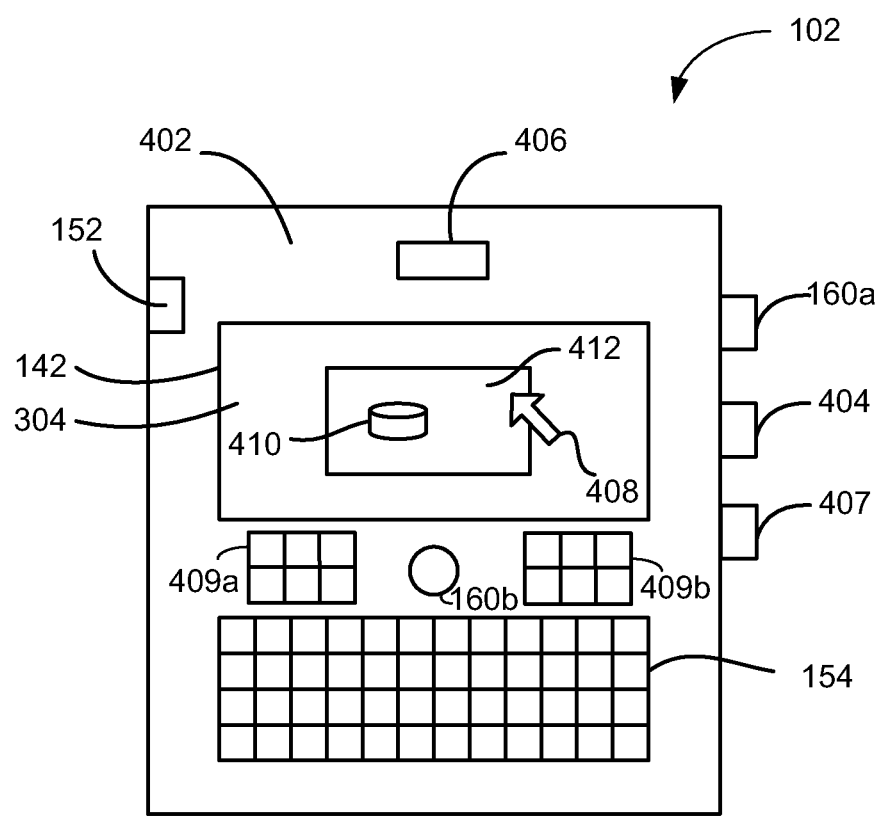
FIG. 4 is a front view illustrating the wireless device of FIG. 1.

Reference is next made to FIG. 4, which shows a front view of the wireless device 102. As mentioned above, the wireless device 102 may be a data and voice-enabled handheld device. The wireless device 102 includes a casing 402, the data or serial port 152, the display screen 142, the graphical user interface (GUI) 304, the keypad 154, the clickable thumbwheel or scroll buttons 160a or other device for navigation such as a trackball 160b, one or more input buttons 404 (e.g., select, cancel, talk, play, stop, fast forward, rewind, next, previous buttons), signal inputs/outputs 406 (e.g., direct wire connection or inductive coupling power connector input, microphone, speaker, data interface input, etc.), and an audio port 407. Alternatively, the discrete keypad 154 may not be used, the display 142 may occupy most of the front side of the casing 402, and the keypad 154 may be integrated with the display 142, as the display 142 is implemented as a touch screen 142, 154 display also accepting input form the user. Additionally, the wireless device 102 may have a number of navigation control buttons represented by numerals 409a and 409b. The navigation control buttons 409 may provide a number of functions such as a send and/or end key for a mobile telephone application of the wireless device 102, a menu key, an escape key, etc. The functions of the navigation control buttons 409 may be user configurable. Internally, the wireless device 102 includes one or more circuit boards (not shown), the microprocessor 140 (FIG. 1), the memory 300 (FIG. 3), the battery 138 (FIG. 1), the antennae 118, 120 (FIG. 1), etc., which may all be coupled to the signal inputs/outputs 406, the keypad 154, the display screen 142, the clickable thumbwheel 160, etc.

The microprocessor 140 is typically coupled to one or more input devices (e.g., the buttons 404, the keypad 154, the clickable thumbwheel 160) for receiving user commands or queries and the display 142 for displaying the results of these commands or queries. For example, user queries may be transformed into a combination of commands for producing one or more tables of output data which may be incorporated in one or more display pages for presentation to the user. The microprocessor 140 is also coupled to the memory 300.

A user may interact with the wireless device 102 and its software modules 306, 308 using the GUI 304. The GUI 304 is controlled by the operating system 302 (FIG. 3) and provides a display format enabling the user to choose commands, execute application programs, manage computer files, and perform other functions by selecting pictorial representations (i.e., icons), or selecting items from a menu through the use of an input or pointing device such as the navigation input device 160 and/or the keypad 154. Generally, the GUI 304 is used to convey information and receive commands from users and generally includes a variety of GUI objects or controls including icons, toolbars, drop-down menus, pop-up menus, text, dialog boxes, buttons, etc. A user typically interacts with the GUI 304 presented on the display 142 by using an input, pointing device, or touch screen device to position a pointer or cursor 408 over an object 410 (i.e., "pointing" at the object) and by "clicking" on the object 410 (e.g., by depressing the navigation input device 160 or a button on the keyboard 154, touching an appropriate position on the touch screen 142, 154, etc.). This is often referred to as a point-and-click or selection operation. Typically, the object 410 may be highlighted (e.g., shaded) when the object 410 is selected or pointed at by the pointer or cursor 408 to indicate that the object 410 is selectable.

Typically, a GUI-based system presents application, status, and other information to the user in windows appearing on the display 142. A window 412 is a display area shown within the display 142, typically rectangular, in which a user may view an application or document. The window 412 may be open, closed, displayed full screen, reduced to an icon, increased or reduced in size, or moved to different areas of the display 142. Multiple windows 412 may be displayed simultaneously. For example, the windows 412 may be displayed within other windows, overlapped with other windows, or tiled within the display area.

Figure 5:
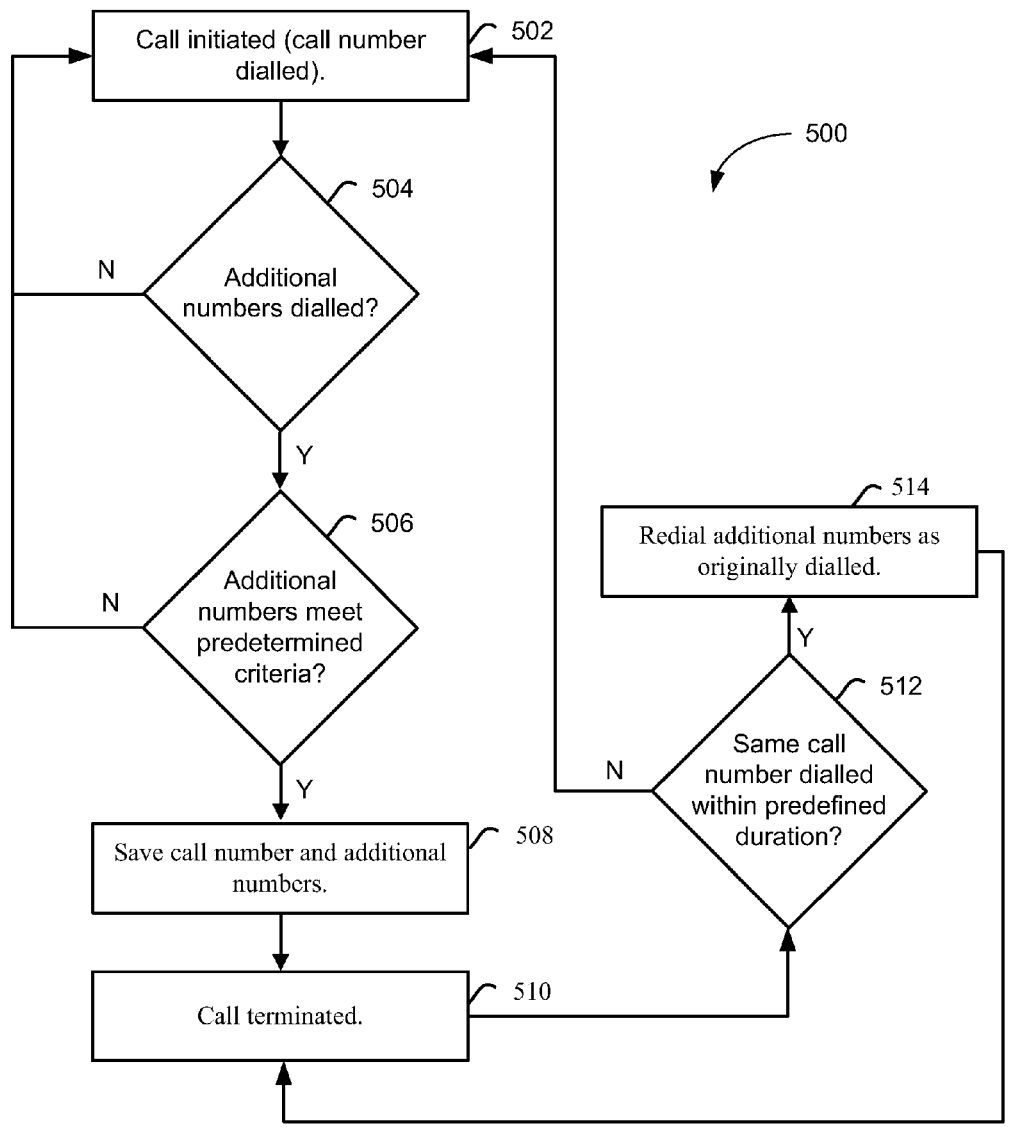
FIG. 5 shows in flowchart form a method for smart conference call redialing in accordance with one implementation.

Reference is next made to FIG. 5, which shows in flowchart form a method 500 for smart conference call redialing. At a first block 502, a user who is using his wireless device 102 initiates a call using the wireless device 102. In one example, the call may be a voice call and the call may be initiated by entering a telephone number (e.g., a first dialed number) into the wireless device 102 using the call module 308, for example using the keyboard 154. In another example, the user may access a stored contact or telephone number using either the call module 308 or one of the other software modules 306 such as a PIM to retrieve a stored number and instruct the wireless device 102 to call the stored number (e.g., the first dialed number). In any event, a call is initiated at the block 502 using the first dialed number, which initiates the method 500.

Next at a block 504, the method 500 monitors for subsequent or additional numbers being dialed after the establishment of the call connection. If additional numbers are dialed after the establishment of the call connection, the method 500 proceeds to a block 506. If additional numbers are not dialed after the establishment of the call connection, the method returns to the block 502 (e.g., waiting for the method 500 to be re-initiated when a new call connection is established).

At the block 506, it is determined whether the additional or subsequent numbers that were dialed after the establishment of the call connection meet predetermined criteria. There are several situations where users typically dial additional numbers after the establishment of a call, such as when interacting with an automated telephone system using DTMF (Dual Tone Multi-Frequency) or when entering a conference calling solution through a conference bridge to participate in a conference call. One objective of the block 506 may be to identify numbers dialed after the establishment of the call connection that are used for entering a conference call, such as passcode like a moderator or participant code, while excluding numbers that are entered for other purposes, such as when interacting with an automated telephone system. In this regard, the predetermined criteria applied in the block 506 for determining if the additional numbers meet the predetermined criteria may include one or more of: a minimum number of the subsequent numbers dialed, a maximum number of the subsequent numbers dialed, and a maximum delay for entry of the subsequent numbers. In other words, the subsequent numbers may all be entered within a first time span of the establishment of the call connection in order to meet the predetermined criteria and a number of the subsequent numbers dialed may fall with a first range in order to meet the predetermined criteria. For example, the first time span may be fifteen seconds and the first range may be between four and ten digits meaning that for the subsequent or additional numbers being entered after the establishment of the call connection to meet the predetermined criteria, the numbers must be entered within fifteen seconds of the establishment of the call connection and the numbers must total between four and ten digits, since conference calling codes are typically sequentially entered shortly after the call is established and typically comprise between four and ten digits. In another example, the predetermined criteria may further include a maximum allowable delay in-between the subsequent digits such as two seconds, meaning that the four to ten digits may have to be entered with no more than a two second delay in-between subsequent digits to meet the predetermined criteria.

In contrast, numbers entered after the establishment of a telephone call for regular automated telephone systems are normally individually entered with some delay (e.g., more than two seconds) between the digits as the user listens to messages from the system over a longer period of time.

While an example of fifteen seconds is used, the first range may be set to any appropriate value depending on the design criteria of a particular application, such as ten seconds, twenty seconds, or even thirty seconds. Likewise, while the example of between four and ten digits is used for the number of subsequent digits, the number may be set to any value according to the design criteria of a particular application, such as between 1 and 15 digits, or between 7 and 9 digits. Additionally, while a number of predetermined criteria are given as examples, such as the first time span, the first range, and the maximum allowable delay in-between digits, these criteria may be individually applied or applied in any combination at the block 506.

If the additional numbers meet the predetermined criteria at the block 506, the method 500 proceeds to a block 508. If the additional numbers do not meet the predetermined criteria at the block 506, the method returns to the block 502 (e.g., waiting for the method 500 to be re-initiated when a new call connection is established).

At the block 508, the additional or subsequent numbers, and optionally the first dialed number, are saved, for example in the memory 300 by the call module 308. Optionally, any delay between the first dialed number and the additional or subsequent numbers, as well as delays in-between each of the additional or subsequent numbers (e.g., each DTMF entry) may also be recorded, as such delays may be important for properly working with some conference bridges. The method 500 then proceeds to a block 510, where eventually the call that was initiated and established at the block 502 is terminated. The call termination may be due to either a remote disconnect (e.g., either the wireless device 102 or the conference bridge inadvertently or intentionally disconnects the call) or a dropped call. If the call was dropped, a failure code may be provided either within the conference bridge and/or within the wireless device 102 by the call module 308. The method 500 then proceeds to a block 512.

At the block 512, the method 500 awaits another call to be initiated within a predefined duration. If a call is not initiated within the predefined duration, the method 500 returns to the block 502 (e.g., waiting for the method 500 to be re-initiated when a new call connection is established). If another call is initiated within the predefined duration but a different number is dialed to initiate the call (e.g., not the first dialed number), the method also returns to the block 502 and progresses to the block 504 to monitor for additional or subsequent dialed numbers. If another call is initiated within the predefined duration and the same first dialed number is used to initiate the call, the method 500 proceeds to a block 514. Optionally, if it was determined at the block 510 that the call was dropped, such as through generation of an error code, the method 500 may present a prompt, for example the call module 308 may present a prompt on the display 142 of the wireless device 102. The prompt may be a "reconnect now" prompt or button, which if selected by the user, may automatically redial the first dialed number with the method 500 next proceeding to the block 514 where the subsequent numbers are then also automatically dialed. Alternatively, the same "reconnect now" prompt or button may also be presented after disconnects in addition to after dropped calls.

In one optional implementation, the method 500 only proceeds to the block 514 if another call is initiated within the predefined duration and the same first dialed number is used to initiate the call and no intervening numbers are dialed (e.g., if the first dialed digit is not the same as the first digit of the first dialed number, the method 500 may immediately proceed to the block 502 and will not proceed to the block 514 even if the first dialed number is called immediately after the intervening number(s)).

In one example, the predefined duration comprises thirty seconds or less. However, the predefined duration may be set to any value according to the design criteria of a particular application, such as 60 seconds. When a user is involved in a conference call that is prematurely or involuntarily terminated and the user wishes to rejoin the conference call, the user typically redials the first dialed number shortly after being disconnected. The method 500 is intended to be effective in this situation, to aid the user in reconnecting with a conference bridge after being disconnected from a conference call in progress.

In this regard, at the block 514 the saved additional or subsequent numbers are loaded from the memory 300 (if not already loaded) and are automatically redialed, so that the user is automatically reconnected with the conference call. Optionally, the numbers may be redialed exactly as originally entered, including any recorded delays. In this way, when the termination of a conference call connection is inadvertent, the subsequent numbers dialed that establish a conference call in a conference bridge are automatically redialed after the user re-establishes the conference call connection so that the conference call is re-established in the bridge without further input needed on the part of the user. After the conference call is re-established with the bridge and the user again participates in the conference call, the method 500 returns to the block 510, where eventually the call that was initiated and established at the block 512 is terminated.

The implementations of the present disclosure described above are intended to be examples only. Those of skill in the art may effect alterations, modifications and variations to the particular implementations without departing from the intended scope of the present disclosure. In particular, selected features from one or more of the above-described implementations may be combined to create alternative implementations not explicitly described, features suitable for such combinations being readily apparent to persons skilled in the art. The subject matter described herein in the recited claims intends to cover and embrace all suitable changes in technology.

The invention claimed is:

1. A wireless device comprising:
a processor and a calling module resident in a memory for execution by the processor to redial into a conference call, the calling module being configured to:
establish a call connection based on a first dialed number;
monitor for subsequent numbers input to the wireless device after establishment of the call connection;
determine if the subsequent numbers meet predetermined criteria for identifying numbers associated with the conference call;
save the first dialed number and the subsequent numbers in the memory as a saved first dialed number and saved subsequent numbers if it is determined that the predetermined criteria are met; and
automatically redial the saved subsequent numbers if the saved first dialed number is redialed following termination of the call connection.

2. The wireless device according to claim 1, wherein the calling module is further configured to, after termination of the call connection:
monitor for the saved first dialed number being redialed within a predefined duration; and
if the saved first dialed number is redialed within the predefined duration, automatically redial the saved subsequent numbers.

3. The wireless device according to claim 2, wherein the termination of the call connection is inadvertent, the subsequent numbers provide entry to the conference call, and automatically redialing the saved subsequent numbers serves to re-establish the conference call without further input after re-establishment of the call connection.

4. The wireless device according to claim 1, wherein the predetermined criteria include at least one of a minimum number of the subsequent numbers, a maximum number of the subsequent numbers, a maximum delay in-between entry of individual ones of the subsequent numbers, and a time span for completing entry of all of the subsequent numbers.

5. The wireless device according to claim 1, wherein the predetermined criteria include the subsequent numbers all being entered within a first time span of the establishment of the call connection and a number of the subsequent numbers falling within a first range.

6. The wireless device according to claim 5, wherein the first time span comprises fifteen seconds and the first range comprises between four and ten digits.

7. The wireless device according to claim 2, wherein the predefined duration comprises thirty seconds or less and the saved subsequent numbers are automatically redialed if the first dialed number is redialed within the predefined duration without any intervening dialing occurring.

8. A method in a wireless device for redialing into a conference call comprising:
establishing a call connection based on a first dialed number;
monitoring for subsequent numbers input to the wireless device after establishment of the call connection;
determining if the subsequent numbers meet predetermined criteria for identifying numbers associated with the conference call;
saving the first dialed number and the subsequent numbers in a memory of the wireless device as a saved first dialed number and saved subsequent numbers if it is determined that the predetermined criteria are met; and
automatically redialing the saved subsequent numbers if the saved first dialed number is redialed following termination of the call connection.

9. The method according to claim 8, further comprising, after termination of the call connection further:
monitoring for the saved first dialed number being redialed within a predefined duration; and
if the saved first dialed number is redialed within the predefined duration, automatically redialing the saved subsequent numbers.

10. The method according to claim 8, wherein the termination of the call connection is inadvertent, the subsequent numbers provide entry to the conference call, and automatically redialing the saved subsequent numbers serves to re-establish the conference call without further input after re-establishment of the call connection.

11. The method according to claim 8, wherein the predetermined criteria include at least one of a minimum number of the subsequent numbers, a maximum number of the subsequent numbers, and a maximum delay in-between entry of individual ones of the subsequent numbers, and a time span for completing entry of all of the subsequent numbers.

12. The method according to claim 8, wherein the predetermined criteria include the subsequent numbers all being entered within a first time span of the establishment of the call connection and a number of the subsequent numbers falling within a first range.

13. The method according to claim 12, wherein the first time span comprises fifteen seconds and the first range comprises between four and ten digits.

14. The method according to claim 8, wherein the predefined duration comprises less than thirty seconds and the saved subsequent numbers are automatically redialed if the first dialed number is redialed within the predefined duration without any intervening dialing occurring.

15. A non-transient computer readable medium having recorded thereon computer executable code for execution by a processor in a wireless device, which configures the processor for redialing into a conference call by:
 establishing a call connection based on a first dialed number;
 monitoring for subsequent numbers input to the wireless device after establishment of the call connection;
 determining if the subsequent numbers meet predetermined criteria for identifying numbers associated with the conference call;
 saving the first dialed number and the subsequent numbers in a memory of the wireless device as a saved first dialed number and saved subsequent numbers if it is determined that the predetermined criteria are met; and
 automatically redialing the saved subsequent numbers if the saved first dialed number is redialed following termination of the call connection.

16. The non-transient computer readable medium according to claim 15, wherein the computer executable code further configures the processor for:
 monitoring for the saved first dialed number being redialed within a predefined duration; and
 if the saved first dialed number is redialed within the predefined duration, automatically redialing the saved subsequent numbers.

17. The non-transient computer readable medium according to claim 15, wherein the termination of the call connection is inadvertent, the subsequent numbers provide entry to the conference call, and automatically redialing the saved subsequent numbers serves to re-establish the conference call without further input after re-establishment of the call connection.

18. The non-transient computer readable medium according to claim 15, wherein the predetermined criteria include at least one of a minimum number of the subsequent numbers, a maximum number of the subsequent numbers, and a maximum delay in-between entry of individual ones of the subsequent numbers, and a time span for completing entry of all of the subsequent numbers.

19. The non-transient computer readable medium according to claim 15, wherein the predetermined criteria include the subsequent numbers all being entered within a first time span of the establishment of the call connection and a number of the subsequent numbers falling within a first range.

20. The non-transient computer readable medium according to claim 19, wherein the first time span comprises fifteen seconds and the first range comprises between four and ten digits.

* * * * *